Sept. 15, 1964 J. E. ABEL 3,149,294

DUAL INPUT PARALLEL "T" NETWORK

Filed Aug. 21, 1962

INVENTOR
JOHN E. ABEL

C. E. Vautrain Jr., Agent

BY Richard L. Reed

ATTORNEY

United States Patent Office 3,149,294
Patented Sept. 15, 1964

3,149,294

DUAL INPUT PARALLEL T NETWORK

John E. Abel, Arlington, Va., assignor to the United States of America as represented by the Secretary of the Navy Filed Aug. 21, 1962, Ser. No. 218,467
3 Claims. (Cl. 333—70)
(Granted under Title 35, U.S. Code (1952), sec. 266)

The invention described herein may be manufactured and used by or for the Government of the United States of America for governmental purposes without the payment of any royalties thereon or therefor.

This invention relates to an improved filter network, and more particularly to an improved dual input variable parallel T network.

It is often desired to obtain a depth of attenuation notch at desired frequencies wherein the notch may be produced at the various frequencies through adjustment or control of the filter network components. To obtain a desired depth of attenuation notch by existing methods it is required that parameters of the internal network be varied to accomplish the result desired. One prior art method requires a variation of at least 3 network components. These components must maintain a very precise ratio of tolerances to accomplish the requirement of maximum attenuation at the desired frequency.

The conventional dual input parallel T configuration, which requires that two external components (an input signal divider) be varied, results in a notch whose attenuation and frequency of attenuation vary as a function of input divider position.

Accordingly, it is an object of the present invention to provide a dual input, variable parallel T network in which notch attenuation remains constant as a function of frequency which is determined by control setting.

It is a further object of the present invention to provide a dual input variable parallel T network which provides greater depth of the attenuation notch at a desired null frequency.

It is a still further object of this invention to provide a dual input variable parallel T network in which the attenuation is independent of the input divider position.

It is a further object of the present invention to provide a dual input variable parallel T network in which greater depth of attenuation notch as well as less critical control value tolerances are obtained through a single additional component.

Other objects and many of the attendant advantages of this invention will be readily appreciated as the same becomes better understood by reference to the following detailed description considered in connection with the accompanying drawings wherein.

The present invention provides an improvement by several orders of magnitude of the attenuation notch obtained by methods used in the prior art, and such improvement is realized through the addition of a phase correction capacitor to a conventional network.

Figure 1:
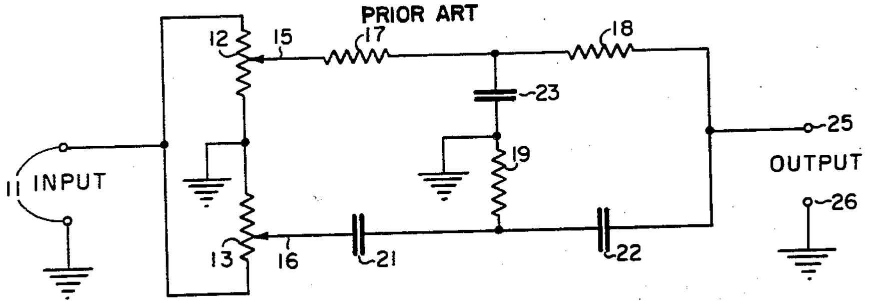
FIG. 1 PRIOR ART
FIG. 1 is a circuit diagram of a conventional dual input variable parallel T network.

Referring to FIG. 1, there is shown input terminals 11 and input divider resistances 12 and 13 whose value may be varied by a setting of potentiometers indicated at 15 and 16. In the embodiments shown, the components are interrelated in such manner that resistances 17 and

18 are each twice the value of resistance 19, while capacitors 21 and 22 are each ½ the value of capacitor 23. The output terminals are indicated at 25 and 26.

Figure 3:
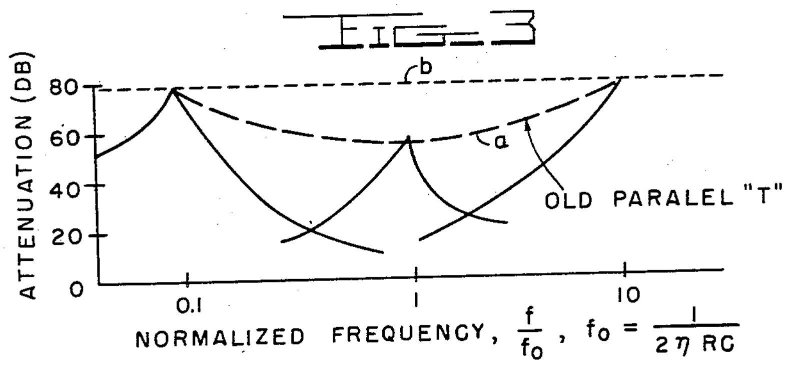
FIG. 3 is a graph of attenuation vs. normalized frequency illustrating the notch obtained by the present invention in comparison with that obtained with conventional dual input variable parallel T networks.

In FIG. 3, the notch attenuation realized through the network of FIG. 1 is illustrated by dashed line "*a*" and is seen as varying directly as a function of the position of potentiometers 15 and 16 and conversely as a function of frequency. The notch depth obtained through the conventional network may thus be observed to vary, as a function of input divider setting, from a maximum of 80 db to a minimum of 60 db.

Figure 2:
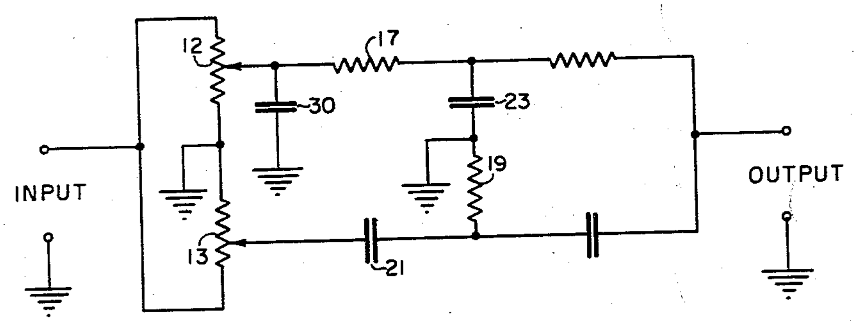
FIG. 2 is a circuit diagram of the conventional dual input variable parallel T network of FIG. 1 with the addition of a single component.

In FIG. 2 is shown the network of FIG. 1 with the added component phase correction capacitor 30 inserted between resistance 12 and resistance 17. This capacitor, of equal value with capacitors 21 and 22, has the unusual and noteworthy effect of substantially improving attenuation at the null frequency, and also rendering attenuation independent of input divider position. The improved characteristics obtained through insertion of capacitor 30 is illustrated by dotted line "*b*" in FIG. 3 which shows no variation in attenuation because of potentiometer setting. Improvements in attenuation of the order of 30 db at the known frequency are now obtained over the results realized through use of the conventional dual input variable parallel T network.

There is thus provided through the present invention means for obtaining a notch with constant attenuation as a function of frequency and control setting. The notch attenuation obtained extends to a greater depth than that realized through the use of conventional dual input variable parallel T networks, and these desirable results are realized without the close control value tolerances necessary to obtain substantially lesser results by conventional networks.

Obviously many modifications and variations of the present invention are possible in the light of the above teachings. It is therefore to be understood that within the scope of the appended claims the invention may be practiced otherwise than as specifically described.

What is claimed is:

1. A dual input variable parallel T filter network comprising:
 a first branch having two resistive elements connected in series;
 a second branch having two capacitive elements connected in series;
 conductive means including a capacitive element and a resistive element serially connected,
 the capacitive element of said conductive means being connected to said first branch intermediate said two resistive elements,
 and the resistive element of said conductive means being connected to said second branch intermediate said two capacitive elements,
 said conductive means being grounded at the juncture of its resistive and capacitive elements;
 first and second potentiometers connecting said first and second branches, respectively, to an input terminal, said potentiometers grounded intermediate one another;
 and phase correction means coupling to ground said first branch at a point intermediate said first potentiometer and the resistive element adjacent to it in said first branch.

2. A dual input variable parallel T filter network comprising:
 a first branch having two resistive elements connected in series;
 a second branch having two capacitive elements connected in series;
 conductive means including a capacitive element and a resistive element serially connected,
 the capacitive element of said conductive means being connected to said first branch intermediate said two resistive elements, and the resistive element of said conductive means being connected to said second branch intermediate said two capacitive elements, said conductive means being grounded at the juncture of its resistive and capacitive elements, said two resistive elements in series being of equal value and said resistive element in said conductive means being one-half the value of each of said two resistive elements, said two capacitive elements in series being of equal value and said capacitive element in said conductive means being twice the value of each of said two capacitive elements;

first and second potentiometers connecting said first and second branches, respectively, to an input terminal, said potentiometers grounded intermediate one another;

and capacitive phase correction means coupling to ground said first branch at a point intermediate said first potentiometer and the resistive element adjacent to it in said first branch, said capacitve phase correction means being of equal value to each of said two capacitive elements in series.

3. A dual input variable parallel T filter network, as recited in claim 1, wherein said phase correction means is a capacitor.

References Cited in the file of this patent

UNITED STATES PATENTS

| | | |
|---|---|---|
| 2,230,803 | Klipsch | Feb. 4, 1941 |
| 2,245,365 | Riddle | June 10, 1941 |
| 2,419,615 | Weldon | Apr. 29, 1947 |
| 2,996,689 | Tanz | Aug. 15, 1961 |
| 3,009,121 | Loebenstein | Nov. 14, 1961 |